US012619476B2

(12) United States Patent
Atluri et al.

(10) Patent No.: US 12,619,476 B2
(45) Date of Patent: May 5, 2026

(54) OPTIMIZATION OF CLOUD EGRESS TASKS

(71) Applicant: International Business Machines Corporation, Armonk, NY (US)

(72) Inventors: Dharma Teja Atluri, Hyderabad (IN); Neelamadhav Gantayat, Bangalore (IN); Avirup Saha, Kolkata (IN); Sampath Dechu, Acton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 405 days.

(21) Appl. No.: 18/215,534

(22) Filed: Jun. 28, 2023

(65) Prior Publication Data

US 2025/0004860 A1 Jan. 2, 2025

(51) Int. Cl.
G06F 9/50 (2006.01)
G06F 9/48 (2006.01)

(52) U.S. Cl.
CPC .............. G06F 9/5083 (2013.01); G06F 9/48 (2013.01); G06F 9/4806 (2013.01); G06F 9/4843 (2013.01); G06F 9/4881 (2013.01); G06F 9/50 (2013.01); G06F 9/5061 (2013.01); G06F 9/5072 (2013.01)

(58) Field of Classification Search
CPC ........ G06F 9/48; G06F 9/4806; G06F 9/4843; G06F 9/4881; G06F 9/50; G06F 9/5061; G06F 9/5072; G06F 9/5083
See application file for complete search history.

(56) References Cited

U.S. PATENT DOCUMENTS

| | | | | |
|---|---|---|---|---|
| 8,171,115 B2 * | 5/2012 | Hamilton | .............. | G06F 9/5011 709/224 |
| 10,666,702 B1 * | 5/2020 | Nielsen | ................. | H04L 65/765 |
| 11,929,838 B1 * | 3/2024 | Singhal | ................... | H04L 67/10 |
| 2017/0366467 A1 * | 12/2017 | Martin | ................ | H04L 12/4625 |
| 2021/0203587 A1 * | 7/2021 | Sidebottom | ........... | H04L 67/104 |

(Continued)

OTHER PUBLICATIONS

Liu et al., Cost- and Throughput-aware Bulk Data Replication in the Cloud, Dec. 16, 2022.

(Continued)

*Primary Examiner* — Charles M Swift
(74) *Attorney, Agent, or Firm* — Garg Law Firm, PLLC; Rakesh Garg; James Olsen

(57) ABSTRACT

An embodiment includes computing a computational cost of a job, using a first machine learning algorithm. The job may include an original amount of an egress of data from a cloud computing environment. The embodiment includes determining, using a second machine learning algorithm, the amount of the egress of data corresponding to the job has a computer business criticality that exceeds a threshold level of business criticality. The embodiment includes analyzing a current egress plan used in computing the computational cost of the job. The embodiment includes reconfiguring the current plan to a second egress plan to reduce the computational cost of the job. The embodiment includes implementing a second plan such responsive to execution of the job, the second plan causes data egress behavior to change from the original egress of data behavior. A modified egress behavior causes an effective reduction in the egress cost of the job.

20 Claims, 7 Drawing Sheets

(56) References Cited

U.S. PATENT DOCUMENTS

| | | | | |
|---|---|---|---|---|
| 2022/0100578 A1* | 3/2022 | Moreira Martins | .... | G06F 9/505 |
| 2022/0210075 A1* | 6/2022 | Musleh | ................... | H04L 47/30 |
| 2022/0374276 A1* | 11/2022 | Mitra | ................. | G06Q 30/0201 |
| 2023/0284083 A1* | 9/2023 | Tesanovic | ............... | H04L 47/30 |
| | | | | 370/235 |

OTHER PUBLICATIONS

Nops, Understanding AWS Egress Costs and How to Avoid Them, 2023, https://www.nops.io/aws-egress-costs-and-how-to-avoid/.

Shaer et al., Efficient execution plan for egress traffic engineering, Computer Networks, vol. 190, May 8, 2021.

Faction, Cloud Egress Charges: How to Prevent These Creeping Costs, Jul. 12, 2021, https://www.factioninc.com/blog/it-challenges/egress-charges-how-to-prevent-costs/.

Smith, Comparing Data Egress Fees Among Cloud Providers, Jan. 31, 2022, https://www.hostdime.com/blog/data-egress-fees-cloud/.

Jain et al., Skyplane: Optimizing Transfer Cost and Throughput Using Cloud-Aware Overlays, Oct. 13, 2022.

Jiang et al., A Cloud-Agnostic Framework to Enable Cost-Aware Scheduling of Applications in a Multi-Cloud Environment, NOMS 2020—2020 IEEE/IFIP Network Operations and Management Symposium, Apr. 20-24, 2020.

Shmookler et al., Calculate AWS Egress Fees Proactively for VMware Cloud on AWS, Apr. 16, 2018.

Techtarget, Finally, a Path to Reducing Public Cloud Egress Fees, 2023, https://www.techtarget.com/searchcloudcomputing/MulticloudStrategy/Finally-a-Path-to-Reducing-Public-Cloud-Egress-Fees.

Mcguinness, Four Easy Ways to Lower Your Microsoft Azure Egress Fees, Mar. 18, 2022, https://www.megaport.com/blog/four-easy-ways-to-lower-your-microsoft-azure-egress-fees/.

Xu et al., Resource Allocation vs. Business Process Improvement: How They Impact on Each Other, Sep. 2008.

11:11 Systems, "Leading Automation. Optimizing Performance", available online at <https://web.archive.org/web/20220406103237/https://1111systems.com/>, Apr. 6, 2022, 3 pages.

James, Orme, "Size of aws data transfer-costs-revealed-in-leaked-internal-documents", available online at <https://www.techerati.com/news-hub/size-of-aws-data-transfer-costs-revealed-in-leaked-internal-documents/>, Oct. 22, 2019, 4 pages.

McKendrick et al., "Cloud computing sticker shock is now a monthly occurrence at many companies", available online at <https://www.zdnet.com/article/cloud-computing-sticker-shock-is-now-a-monthly-occurrence-for-many-companies/>, May 26, 2018, 5 pages.

* cited by examiner

OPTIMIZATION OF CLOUD EGRESS TASKS

BACKGROUND

The present invention relates generally to creating recommendations for cloud-based business tasks. More particularly, the present invention relates to a method, system, and computer program for optimizing egress of data jobs from cloud storage systems. The cost and effect on the business criticality are taken into consideration when making recommendations for performing the task of moving data.

Cloud storage is a computing model that enables storing data and files on the internet through a provider that can be accessed either through the public internet or a dedicated private network. The provider of the cloud storage securely stores, manages, and maintains the storage servers, infrastructure, and network to ensure a user has access to the data when needed. Often a large amount of data can be stored ranging from gigabytes (GB) to hundreds of terabytes (TB). Many cloud storage providers do not charge for adding data to the storage system. However, costs for removing data can quickly add up causing huge unknown costs that are not charged until the end of a month or predetermined billing cycle.

Cloud storage providers usually do not charge to transfer data into a cloud storage system which is called ingress. Ingress is when data leaves a network and goes to an external location. The network may be the network of a business. The external location may be a cloud storage system. When a user decides they need to access their data, the user will start an egress process. Egress occurs when a user's application writes data out to the user's internal network. Egress also occurs when a user repatriates data back to the user's on-premise environment.

Data egress fees are one of the cloud's biggest hidden costs. Egress in the world of computer networking is traffic exiting an entity such as a cloud storage provider. Ingress is traffic entering the boundary of an entity such as a cloud storage provider. Ingress and egress can also refer to the movement of traffic into and out of a network, respectively. Large egress fees, those costing thousands of dollars per year, can hurt both large and small businesses. Cloud billing as part of public cloud adoption is considered a difficult concept to understand by both business leaders and Information Technology (IT) experts. Cloud storage providers include Amazon Web Service®, Azure®, Google Cloud and many other companies that provide storage options for businesses that can be accessed through the public internet or dedicated private networks (Amazon Web Service, Azure, are trademarks owned by their respective owners in the United States and other countries). The cloud storage providers place a limit on how much data can be transferred out of the cloud egress for free or lower cost.

SUMMARY

The illustrative embodiments provide for optimization of cloud egress costs. An embodiment includes computing a computational cost of a job, using a first machine learning algorithm. The job may include an original amount of an egress of data from a cloud computing environment. The embodiment also includes determining, using a second machine learning algorithm, the amount of the egress of data corresponding to the job has a computer business criticality that exceeds a threshold level of business criticality. The embodiment also includes analyzing a current egress plan used in computing the computational cost of the job. The embodiment also includes reconfiguring the current plan to a second egress plan to reduce the computational cost of the job. The embodiment also includes implementing a second plan such responsive to execution of the job, the second plan causes data egress behavior to change from the original egress of data behavior. A modified egress behavior causes an effective reduction in the egress cost of the job.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
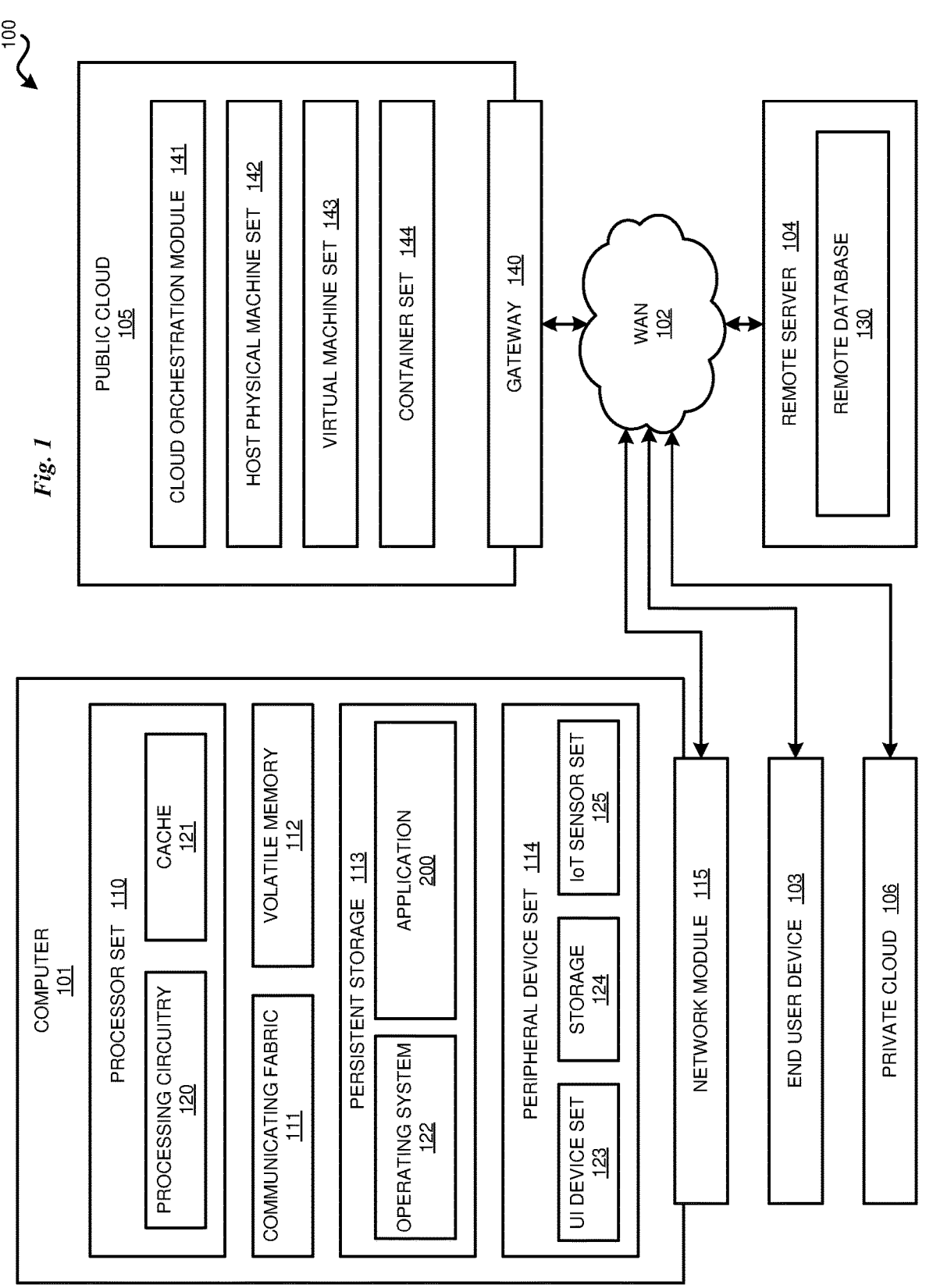
FIG. 1 depicts a block diagram of a computing environment in accordance with an illustrative embodiment.

Cloud storage providers usually do not charge to transfer data into a cloud storage system which is called ingress. Ingress is when data leaves a network and goes to an external location. This external location may be a cloud storage system. When a user decides they need to access their data, the user will start an egress process. Egress occurs when a user's application writes data out to the user's internal network. Egress also occurs when a user repatriates data back to the user's on-premise environment. A cloud storage provider may also charge customers when the cloud storage provider moves data from one geographical location to a new geographical location to accelerate speeds for other users of the cloud storage system.

Data egress fees are often described as hidden fees because they are billed in arrears. In various situations, business applications, workloads, and users may continue to extract data and unknowingly increase egress costs before a business realizes the total cost of egress for the business cycle. It can be a challenge for organizations to monitor and manage egress fees especially in large businesses having multiple offices, departments, or branches all conducting data analytics.

There is no known tool that allows users to estimate the cost of egress of data out of a cloud storage provider. Many cloud service providers allow ingress of data into the provider's cloud storage for free. Cloud service providers also allow a certain amount of data egress for no to low cost. By non-limiting example, a cloud storage service provider may charge $0.09/GB for 1 GB to 10 GB of data egress from the cloud storage system. The cost of egress may be lower per unit of data when more units are transferred at one time or during the business cycle. Such as by non-limiting example, the cost per GB may be $0.05 when 150-500 TB are transferred for a total cost of $25,000 for the egress of 500 TB of data at one time. These costs may include limits that can be for a business cycle, a cycle may include a month, a business quarter, or another amount of time agreed upon by the cloud storage service provider and the user.

Data egress fees are one of the cloud's biggest hidden costs. Egress as referred to herein is traffic exiting an entity such as a cloud storage provider in the world of computer networking. Ingress is traffic entering the boundary of an entity such as a cloud storage provider. Ingress and egress can also refer to the movement of traffic into and out of a network, respectively. Large egress fees, those costing thousands of dollars per month. Egress fee minimization is a desirable consideration for businesses and users. Cloud billing as part of public cloud adoption is considered a difficult concept to understand by both business leaders and Information Technology (IT).

Currently, users are only given full egress prices at the end of a billing cycle. Users are not told the cost of an egress of data for a certain job at the time of performing the job. The user does not know how much an egress costs until it has been completed, sometimes days or weeks after the job has been performed. Therefore, a need exists for a predictive approach that calculates the cost of the egress of data based on the usage of the user or business up to that time in the month, billing cycle, or business cycle. This would allow a business to set up limits for the total egress performed in a cycle. The business could also decide at the time of the proposed egress if the business criticality is worth the cost of the egress of data. Business criticality as referred to herein includes a threshold for a factor to be considered important to the business overall. If the threshold is met for the particular factor chosen, the system will include that factor in the calculations. Examples of factors considered in a threshold of business criticality may include, by non-limiting example, the type of task or egress that is being proposed such as a threshold of data usage for the month. A factor used in business criticality may also include an impact the egress of data will have on the business such as by non-limiting example, the impact the egress will have on revenue, compliance, and other business considerations.

The illustrative embodiments provide for optimization of cloud egress tasks. An egress task as referred to herein is a movement of data out of a cloud storage system. Embodiments disclosed herein describe a method for calculating egress data charges; however, use of this example is not intended to be limiting but is instead used for descriptive purposes only.

A system and method for predicting and optimizing the cost of an egress task can help users avoid surprise costs. In other illustrative embodiments, the method may also provide a user with the information to weigh reducing costs with improving business impact by deciding to proceed with an egress that has a high business value despite a high cost of egress. The method may give an Information Technology (IT) operations department in a business the ability to plan the egress of data for the business to minimize costs. The method may also give IT managed service providers the ability to articulate the business value and provide proactive maintenance to an internal business network. Planning proactive maintenance may allow the IT managed service providers the ability to perform the maintenance in low use cycles therefore reducing costs while improving the network through proactive maintenance.

Typical client engagements across a large-scale data center allow ingress of data into a cloud without charging the user. A large-scale data center may be referred to as a hyperscaler. A hyperscaler as referred to herein is a type of large-scale data center that offers massive computing resources in the form of an elastic cloud platform. When the user wants to move data between data centers or outside the cloud there are egress data charges which may be pay per use. In an organization, individual users do not normally have access to the metered connection showing the workload of a particular egress of data or other business activity being performed. This lack of information to the user may result in unwanted egress data charges which could have been avoided by knowing the size and cost of the egress data task.

For example, a business may be required to perform a special audit data extraction requiring data egress from a cloud storage provider. While the business is required to provide the data to a third-party auditor, the timing of the egress may be flexible. The business may be able to delay the egress or perform another workaround. Using various embodiments of the method described herein, the business may be able to, by non-limiting example, check on current total egress data usage versus the limit of data egress for the business cycle before the egress data load is initiated. Having the current egress data usage and egress data limits may allow the business to decide to delay the egress for an alternative future time or leverage other possible alternatives recommendations. Alternative recommendations referred to herein may include performing egress of data in portions of the whole rather than performing data egress of the entire required data in a single job at a single time. Alternative recommendations may also include utilizing intra rather than inter cloud movement of data. Alternative recommendations may also include utilizing other cloud storage providers.

Furthering the example, various embodiments of the method may calculate the contribution of the egress of data based on historical trends. The method may also calculate the contribution of the data egress based on the selection of data being provided as input by the user. The method may also be able to calculate the business criticality of the egress of data with respect to an impact on other aspects of the business such as seasonal considerations, regional considerations, commercial or product deployment, and other dimensions of the business that may help to prioritize data egress workloads.

Using the example above, the method is able to make calculated decisions for optimizing cloud storage operation costs and identify potential alternative data egress workloads. By non-limiting example, potential alternative data egress workloads may include determining which cloud architecture services in the future can be used to avoid high costs and data exposure.

Illustrative embodiments include calculating a first cost of egress of data from a first source. The amount of data in the egress task may be submitted by a user. A user as referred to herein may include an individual or a business. The embodiment may include computing a computational cost of a job using a first machine learning algorithm. The first machine learning algorithm may take into account historical data. The first machine learning algorithm may also take into account a set of user defined factors. Taking into account historical data allows the system to be dynamic in making computations of computational costs and in reconfiguring the plan for the egress of data. The system does more than only determining if a limit for the amount of egress data has been reached for the month or business cycle. The job may include an original amount of an egress of data from a cloud computing environment. The cloud computing environment may be a data center in some embodiments. The embodiment may include using a second machine learning algorithm to determine a computer business criticality that exceeds a threshold level of business criticality for the amount of the egress of data corresponding to the job and what the computed business criticality. As referred to herein, a business criticality is factors affecting the business. A business criticality may include impact on the business overall, priority of egress task on business, impact of egress of data on revenue, timing of the egress of data task, what other campaigns may be in progress within the business, and other factors that may be important to a business. The business criticality may be supplied by a requirements database where budgets, timelines, and other factors affecting the business are supplied by a user in a business.

Illustrative embodiments include analyzing a current egress plan used in computing the computational cost of the job. Illustrative embodiments also reconfiguring the current plan to a second egress plan to reduce the computational cost of the job. Illustrative environments also include implementing a second plan such that responsive to execution of the job, the second plan causes data egress behavior to change from the original egress of data behavior. A modified egress behavior causes an effective reduction in the egress cost of the job.

The method may also include calculating not only the cost of the egress of data but also the timing of the egress of data. The method may includes taking historical data into account for previous similar egress of data tasks. This allows the system to account for trends in the business. The method is able to calculate egress of data costs and create plans using a predetermined business criticality rather than static rules such as no egress of data tasks once the monthly limit is reached. Creating plans using business criticality allows the business to make decisions that are better for the business overall and not based solely on cost or size of egress of data tasks. The method also enables the user to decide whether the egress of data is done at the time of the request or done at a later time as recommended by the system.

Illustrative embodiments also include generating a recommendation for a submission time for the egress of data job. The recommendation may include an alternate time for the egress of data. The alternative time may result in a second cost that is lower than the first cost calculated by the system. The recommendation may also include an alternate destination of cloud service provider. The system may provide a recommendation for a second cloud storage provider to be used at a future time based on historical data stored in a job repository. The historical data may include, by non-limiting example, a cloud storage service, a seasonality of the workload, a source of data, and a destination.

Illustrative embodiments present recommendations to a user. The recommendations may include proceeding with the first cost of egress of data or proceeding with the plan created by the system. Illustrative embodiments may compare the first cost to a business limit. A business limit as referred to herein may include a data limit or a cost limit for the egress of data. The system may also optimize the cost of the egress of data in relation to the business purpose. The recommendations may include predicting an impact on the business in choosing the plan generated by the system.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as system for calculating and optimizing egress of data from a cloud storage system 200. In addition to application 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and application 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in application 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open-source Portable Operating System Interface-type operating systems that employ a kernel. The code included in application 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
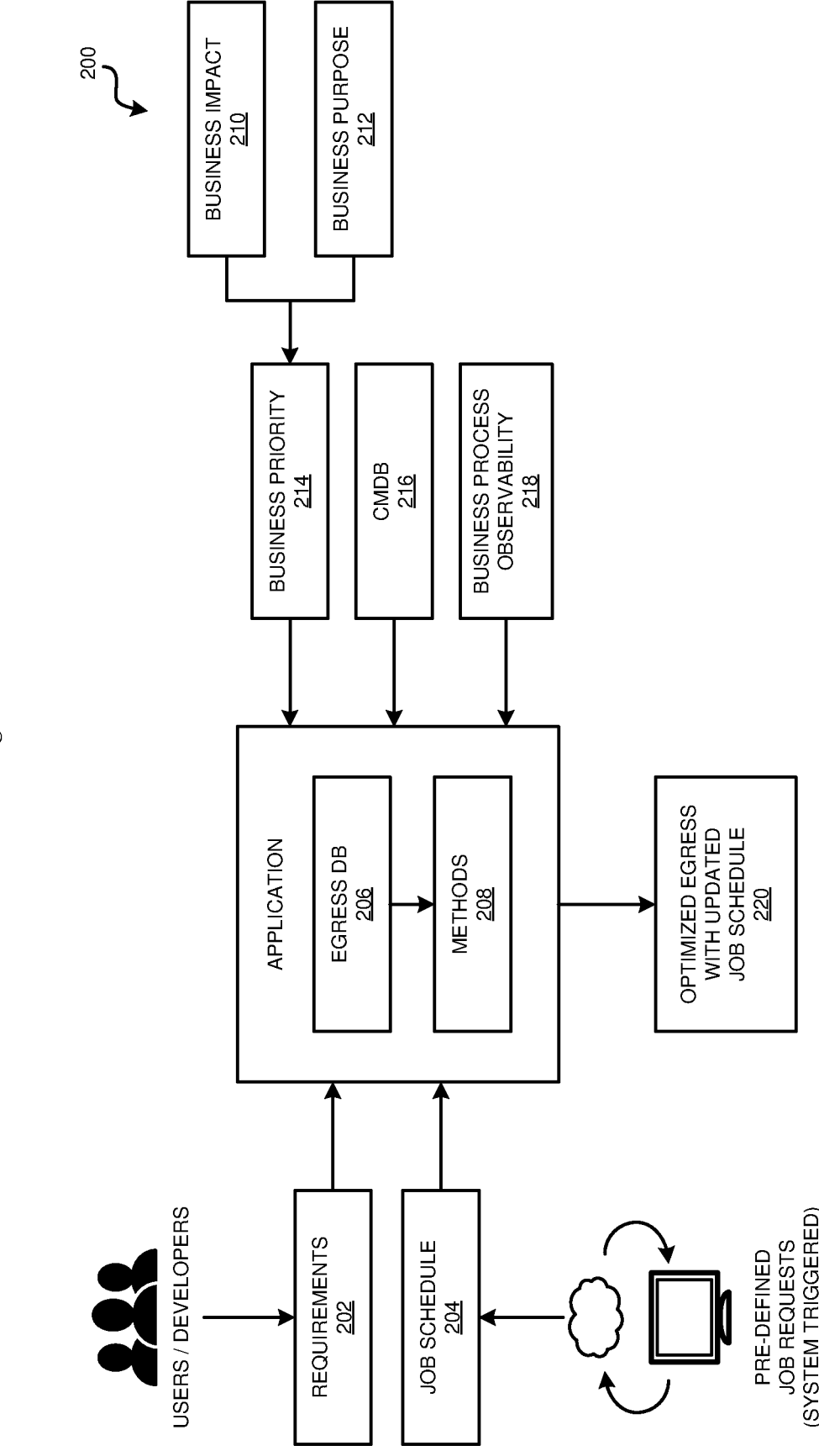
FIG. 2 depicts a block diagram of a system overview in accordance with an illustrative embodiment.

With reference to FIG. 2, this figure depicts a block diagram of an example application 200 to perform a method for calculating and optimizing egress of data from a cloud storage system.

The method includes users providing requirements 202 of the egress of data to the system. The requirements may include the size of the egress of data job or the number of GB or TB to be retrieved in the job. The system also includes a job schedule 204. The job schedule may be determined by pre-defined job requests. The requirements 202 and job schedule 204 are fed into the egress database (DB) 206. The system also includes feeding business impact data 210 and business purpose data 212 into a business priority block. The system also includes a Configuration Management Database (CMDB) 216. The CMDB is particular to a user and may contain all the systems of an enterprise client landscape. Such as by non-limiting example, a client will have multiple systems that are affected by an egress of data. This information may be fed into the system to increase the usefulness of the recommendations provided by the method. The method also includes feeding business process observability

218 into the application. Using all the information provided the method creates a plan for the egress of data based on the business criticality and generates a recommendation for an optimized egress of data with an updated job schedule. An updated job schedule as referred to herein include a second submission time for the egress of data different than the first job schedule submitted by the user.

The benefits of the method include no unanticipated cloud costs for egress of data. Benefits may also include a reduction in total cost of ownership of the cloud storage service. In some business situations the high unexpected cost of egress of data from a cloud storage provider may outweigh a benefit of maintaining the cloud storage provider. The method as described herein provides users and business with a cost of egress of data before the egress job is performed allowing the users to make more informed decisions. Benefits of the method also include allowing a user to reschedule egress of data jobs to control costs of cloud storage systems while still considering the business criticality of the egress of data job. Another benefit of the method as described herein may include the ability to plan egress of data jobs for a future time allowing the business to set restrictions on the time and total cost of the egress of data jobs across a business network.

Figure 3:
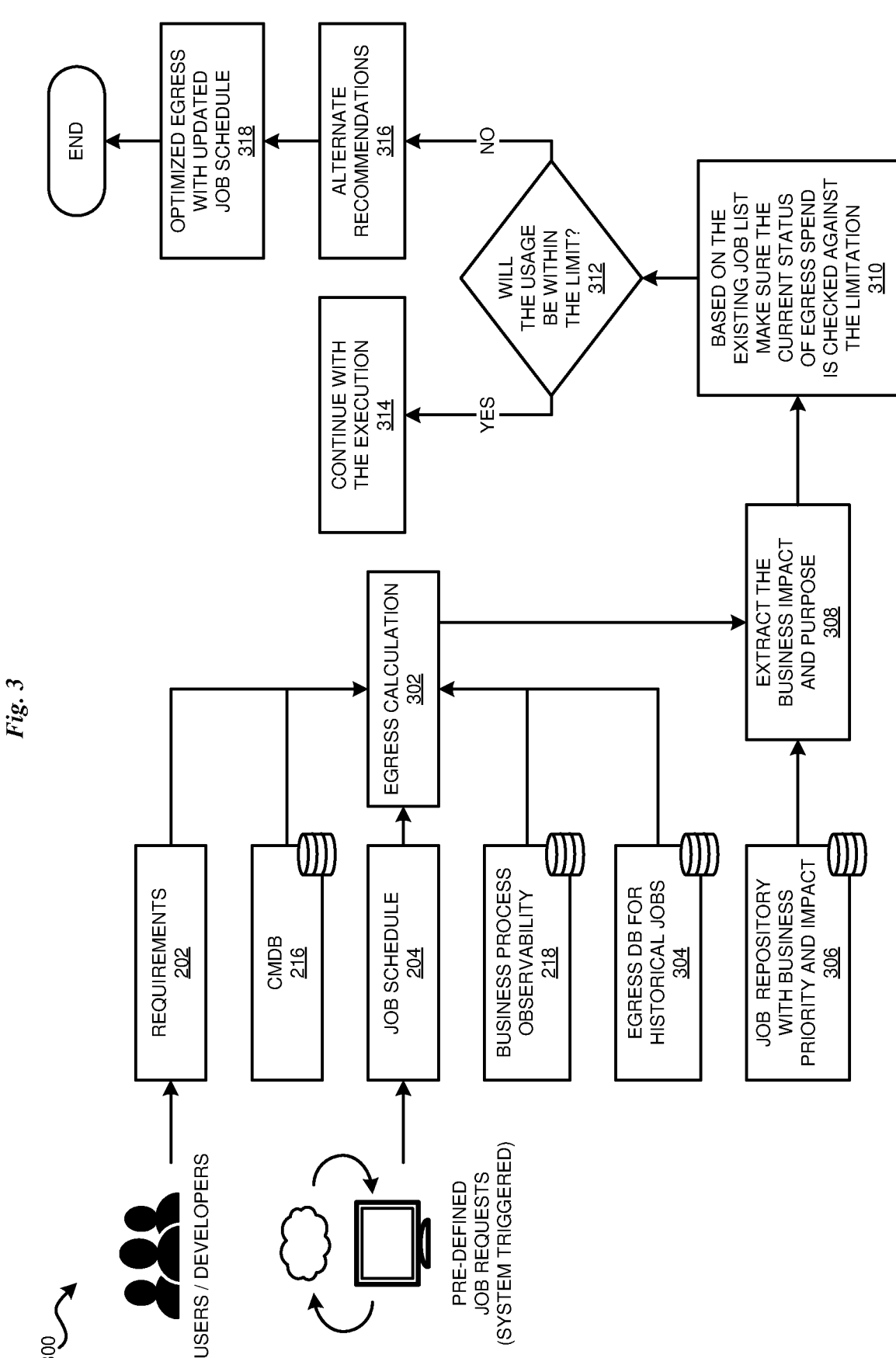
FIG. 3 depicts a flowchart of an example algorithm for calculating optimized egress of data in accordance with an illustrative embodiment.

With reference to FIG. 3, this figure depicts a flowchart of an example algorithm 300 for calculating optimized egress of data in accordance with an illustrative embodiment.

The method includes an egress calculation 302 using the requirements 202 submitted by a user. The user requirements will be converted into either XML, YML, or config file parsing statements into SELECT based inputs along with derived parameters. The egress calculation 302 also includes a CMDB 216 based on specific system and network requirements of a business. By non-limiting example, a CMDB may include Service Now registry of each system and the cloud in which it is deployed. In various embodiments, the egress calculation 302 also includes input of a job schedule as pre-defined for job requests by a business or network. By non-limiting example, the job schedule information can come from SAP® Build Process Automation (BPA) Application Programing Interface (API), Trader Workstation Software (TWS) API, D-Series, or other job scheduling tools. The egress calculation may also include information from a business process observability database 218 and an egress database for historical jobs 206. The egress database for historical jobs 206 may include information from previous egress of data jobs where the historical data can be used to further optimize the recommendations. The historical data can also be used to provide suggestions for alternate cloud storage systems.

After the egress calculation 302 is made for the first job submitted by the user, the business impact and purpose 304 of the egress of data job is extracted. Extracting the business impact and purpose is facilitated by the job repository with business priority and impact 302. The job repository can be populated using information from previous egress of data jobs that are, by non-limiting example, collected by the system or provided by a user.

Once the business impact and purpose 304 are extracted, the method checks the current cost of egress of data jobs compared with the limit for the business cycle 306. The method includes using the existing job list and requirements of the job submitted by the user. If the egress of data job is within the usage limits 308 of the business cycle, the system gives the user the option to continue with executing the egress of data job 310 as originally submitted by the user. If the egress of data job will not be within the usage limits of the business cycle, the system will generate an alternate recommendation 312 for an optimized egress of data job schedule. Once the optimized egress of data 314 recommendation is generated the calculation ends. The user may decide whether to continue with the egress of data job as originally submitted or the user may choose to execute the optimized egress of data job at an updated future time.

Figure 4:
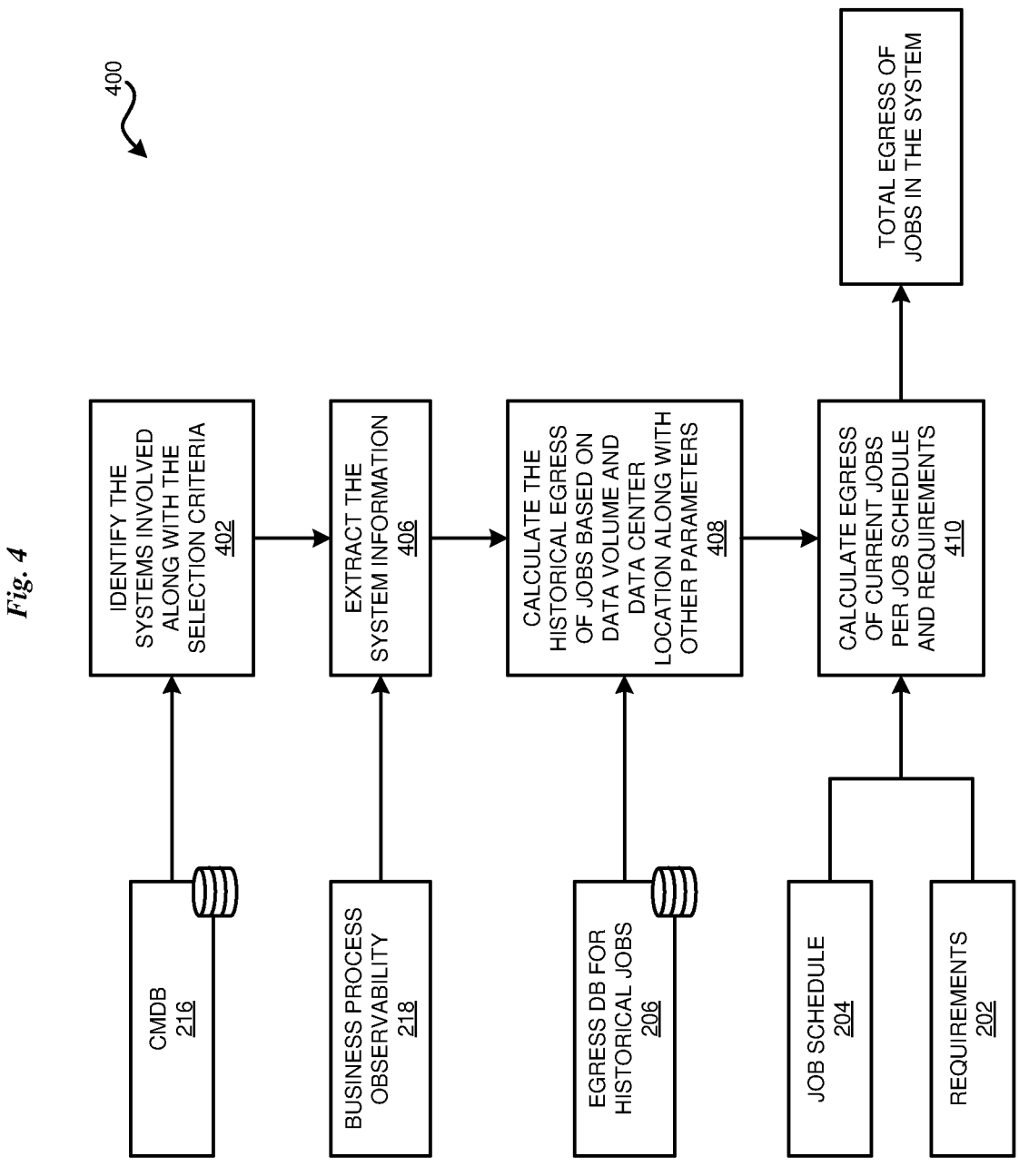
FIG. 4 depicts a block diagram of an example egress calculation in accordance with an illustrative embodiment.

With reference to FIG. 4, this figure depicts an example egress calculation in accordance with an illustrative embodiment. In the illustrated embodiment, the egress calculation 400 is an example of a calculation 302 of FIG. 3.

An illustrative embodiment of an egress calculation is performed on the egress of data job as submitted by a user. The calculation includes identifying systems 402 involved in the egress of data job. The calculation also includes identifying the selection criteria for the business criticality of the egress of data job. The method includes using information provided by the CMDB of the business utilizing the system to calculate an optimized schedule for an egress of data job. The systems and selection criteria may be provided by the hyperscaler, on-premises system, or large-scale data center on which the system for optimizing egress of data is deployed.

The egress calculation includes extracting the system information from the network on which the system is deployed. At this step, the business process observability is utilized in the calculation. The calculation also includes calculating the historical egress of data jobs based on data volume and data center location. Other parameters are also used in the calculation. Previous methods of calculating egress data costs only provide information for egress of data jobs that have already been executed. This method can provide projections for data usage based on historical egress of jobs information. The calculation further includes calculating egress of data of current jobs using the egress of data job schedule and requirements 410. The calculation of cost of egress of data of the current job as submitted by the user includes the job schedule 204 and job requirements 202 as previously described.

Figure 5:
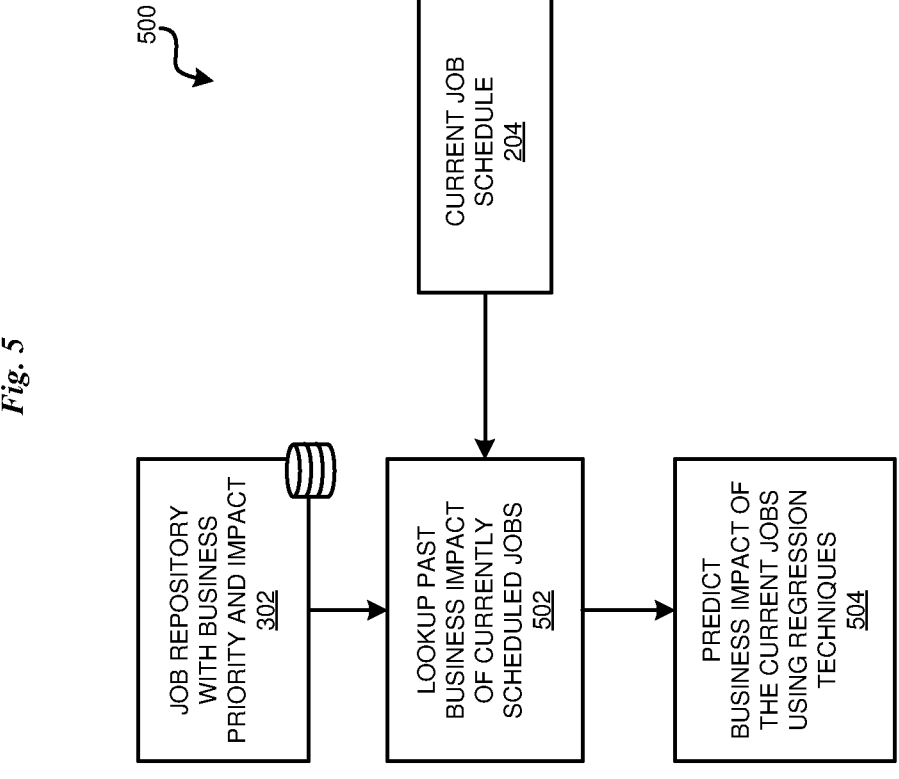
FIG. 5 depicts a block diagram of an example extraction of business criticality in accordance with an illustrative embodiment.

With reference to FIG. 5, this figure depicts an example extraction of business criticality in accordance with an illustrative embodiment. In the illustrated embodiment, extraction of a business criticality is determined utilizing a job repository 302. The job repository 302 includes information on business priority and impact. As previously described, business priority and impact may include seasonality, egress cost, revenue impact of previous jobs, timing of jobs and whether they were urgent or able to be performed at a different time. The current job schedule 204 is fed into the block for looking up past business impact of jobs similar to currently scheduled jobs. By analyzing the job repository, past business impact and current job schedule, the system can predict a business impact of the egress of data job submitted by the user 202 in the overall method.

Figure 6:
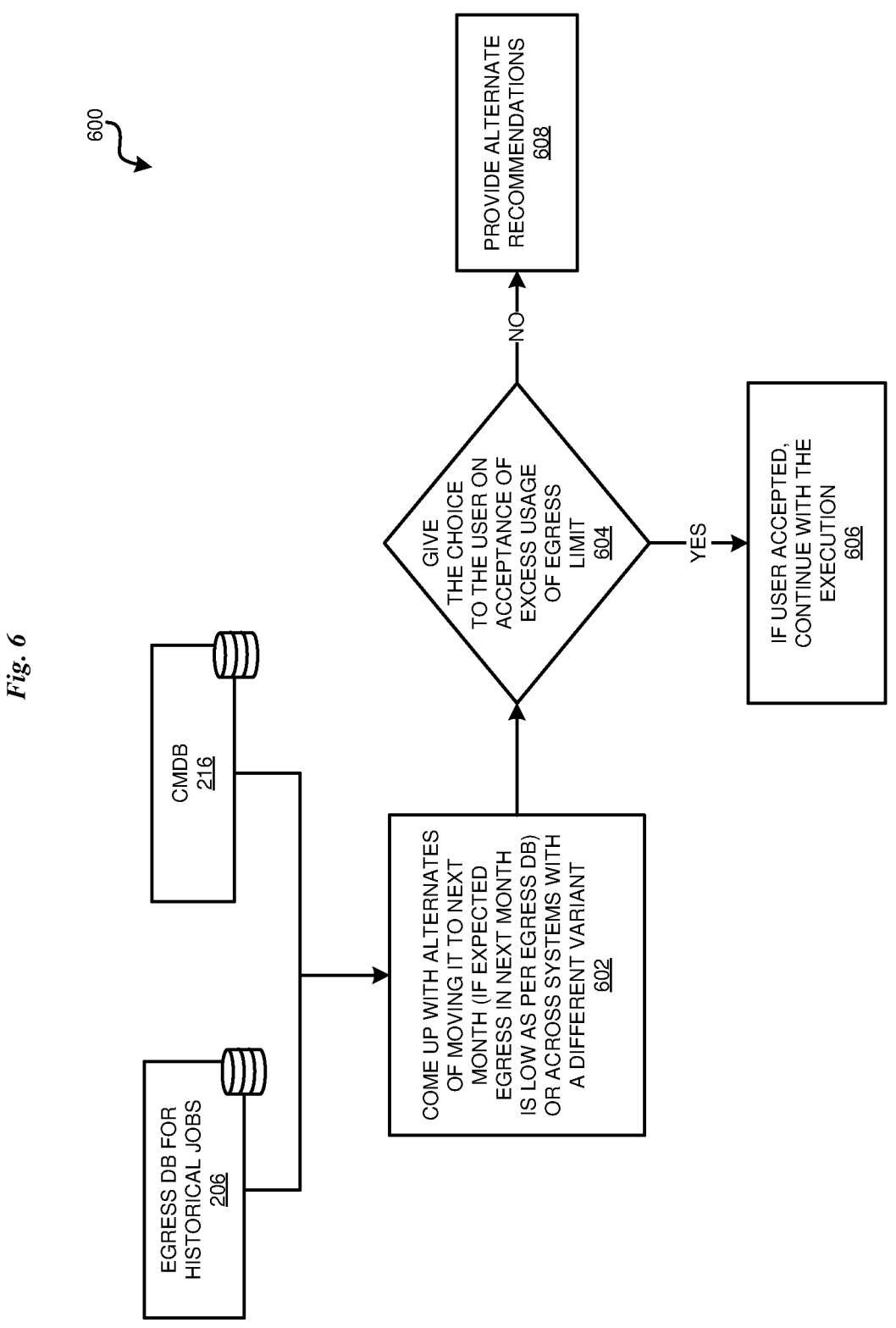
FIG. 6 depicts a block diagram of an example alternate recommendation in accordance with an illustrative embodiment.

With reference to FIG. 6, this figure depicts a block diagram of an example of generating a recommendation in accordance with an illustrative embodiment. The recommendation is generated by the system by utilizing the egress for historical jobs database 206 and the CMDB 216 of the user's network. The system comes up with alternative times 602 for executing the egress of data job as submitted by the user using the requirements 202 submitted by the user as illustrated in FIG. 2. The alternative times 602 may include the next calendar month. The next calendar month may be determined to be a possible alternative if the egress of data for the next month is predicted to be low according to the egress database 206. In other embodiments, alternatives suggested by the system may include moving the egress of data job to a different system with a different variant.

Once a recommendation for an alternative is generated, the system gives the user a choice 604 to accept the excess usage of the egress limit for the business cycle. A user may accept the excess usage because the cost of the egress of data job is worth the impact to the business. If the user accepts 606 the excess usage of egress limit for the business cycle, the egress of data job as submitted by the user is executed. If the user does not accept the excess usage of the egress limit for the business cycle, the system provides the recommendations for alternate egress of data jobs 608. The user may then accept one or more of the recommendations provided by the system.

Figure 7:
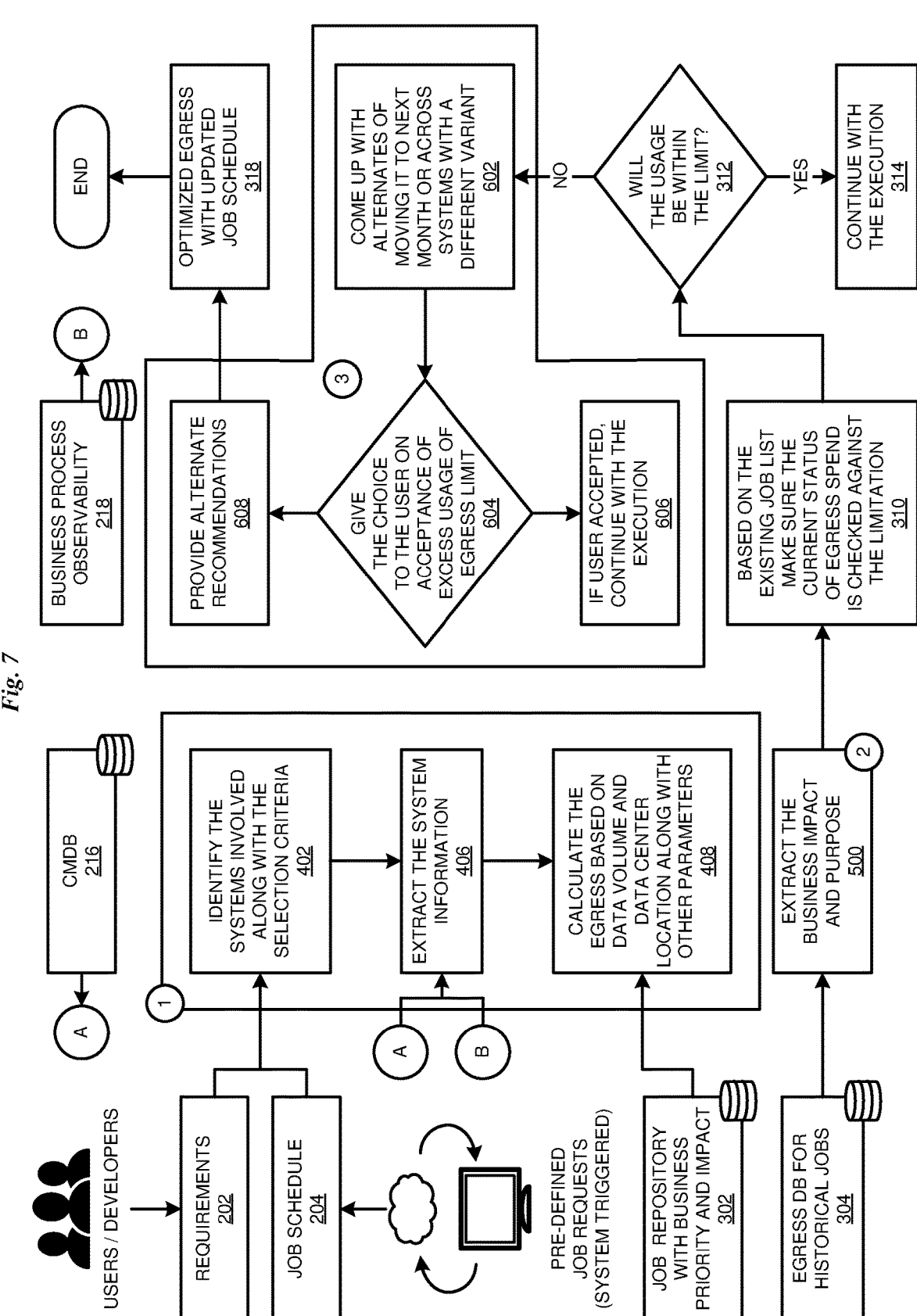
FIG. 7 depicts a block diagram of an example egress optimization system in accordance with an illustrative embodiment.

With reference to FIG. 7, this figure depicts a block diagram of the system and method of the optimization of the cloud egress tasks.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
computing a computational cost of a job, using a first machine learning component, the job comprising an original amount of an egress of data from a cloud computing environment;
  determining, using a second machine learning component, the amount of the egress of data corresponding to the job has a computed criticality that exceeds a threshold level of criticality for a cycle wherein the computed criticality comprises computing an impact of the amount of the egress of data corresponding to the job from the cloud computing environment for the cycle;
  responsive to the amount of the egress of data corresponding to the job has the computed criticality that exceeds the threshold level of criticality for the cycle, causing to keep a current egress plan or to reconfigure the current egress plan to a second egress plan, analyzing a current egress plan used in computing the cost of the job and reconfiguring the current egress plan to the second egress plan to reduce an egress cost of the job; and
  implementing a second plan such that responsive to execution of the job, the second plan causes data egress behavior to change from the original egress of data behavior, wherein a modified egress behavior causes an effective reduction in the egress cost of the job.

2. The computer-implemented method of claim 1, wherein the first machine learning component takes into account historical data and a set of user defined factors.

3. The computer-implemented method of claim 1, wherein reconfiguring the current plan comprises an alternate time for the job.

4. The computer-implemented method of claim 1, wherein the first machine learning component comprises historical data stored in a job repository comprising a priority and an impact.

5. The computer-implemented method of claim 1, further comprising comparing the original egress of data job to a threshold of the criticality.

6. The computer-implemented method of claim 1, further comprising optimizing the cost the computational cost in relation to a threshold of the criticality.

7. The computer-implemented method of claim 1, wherein the second egress plan comprises predicting the impact wherein predicting the impact is based on seasonality and revenue of past jobs in the cycle.

8. The computer-implemented method of claim 1, wherein the second egress plan comprises an alternative cloud storage provider.

9. The computer-implemented method of claim 1, further comprising providing an option to choose the original egress of data job or the second egress plan wherein the second egress plan having an excess cost over the original egress of data job is chosen.

10. A computer program product comprising one or more computer readable storage medium, and program instructions collectively stored on the one or more computer readable storage medium, the program instructions executable by a processor to cause the processor to perform operations comprising:
  computing a computational cost of a job, using a first machine learning component, the job comprising an original amount of an egress of data from a cloud computing environment;
  determining, using a second machine learning component, the amount of the egress of data corresponding to the job has a computed criticality that exceeds a threshold level of criticality for a cycle wherein the computed criticality comprises computing an impact of the amount of the egress of data corresponding to the job from the cloud computing environment for the cycle;
  responsive to the amount of the egress of data corresponding to the job has the computed criticality that exceeds the threshold level of criticality for the cycle, causing to keep a current egress plan or to reconfigure the current egress plan to a second egress plan, analyzing a current egress plan used in computing the cost of the job and reconfiguring the current egress plan to the second egress plan to reduce an egress cost of the job; and
  implementing a second plan such that responsive to execution of the job, the second plan causes data egress behavior to change from the original egress of data behavior, wherein a modified egress behavior causes an effective reduction in the egress cost of the job.

11. The computer program product of claim 10, wherein the stored program instructions are stored in a computer readable storage device in a data processing system, and wherein the stored program instructions are transferred over a network from a remote data processing system.

12. The computer program product of claim 10, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

comparing the original amount of egress of data job to a threshold of the criticality.

13. The computer program product of claim 10, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

providing an option to choose the original amount of the egress of data job or the second egress plan wherein the second egress plan having an excess cost over the original egress of data job is chosen.

14. The computer program product of claim 10, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

optimizing the computation cost in relation to a threshold of the criticality.

15. The computer usable program product of claim 13, wherein the computer usable code is stored in a computer readable storage device in a server data processing system, and wherein the computer usable code is downloaded over a network to a remote data processing system for use in a computer readable storage device associated with the remote data processing system.

16. A computer system comprising a processor and one or more computer readable storage media, and program instructions collectively stored on the one or more computer readable storage media, the program instructions executable by the processor to cause the processor to perform operations comprising:

computing a computational cost of a job, using a first machine learning component, the job comprising an original amount of an egress of data from a cloud computing environment;

determining, using a second machine learning component, the amount of the egress of data corresponding to the job has a computed criticality that exceeds a threshold level of criticality for a cycle wherein the computed criticality comprises computing an impact of the amount of the egress of data corresponding to the job from the cloud computing environment for the cycle;

responsive to the amount of the egress of data corresponding to the job has the computed criticality that exceeds the threshold level of criticality for the cycle, causing to keep a current egress plan or to reconfigure the current egress plan to a second egress plan, analyzing a current egress plan used in computing the cost of the job and reconfiguring the current egress plan to the second egress plan to reduce an egress cost of the job; and implementing a second plan such that responsive to execution of the job, the second plan causes data egress behavior to change from the original egress of data behavior, wherein a modified egress behavior causes an effective reduction in the egress cost of the job.

17. The computer system of claim 16, wherein the first machine learning component takes into account historical data and a set of user defined factors.

18. The computer system of claim 16, wherein reconfiguring the current plan comprises an alternate time for the job.

19. The computer system of claim 16, further comprising:

further comprising optimizing the cost in relation to a threshold of the criticality.

20. The computer system of claim 16, further comprising providing an option to choose the original egress of data job or the second egress plan wherein the second egress plan having an excess cost over the original egress of data job is chosen.

*     *     *     *     *